(12) United States Patent
Kataria et al.

(10) Patent No.: US 11,347,573 B2
(45) Date of Patent: *May 31, 2022

(54) IN-DRIVE BUS TRACE

(71) Applicant: Seagate Technology LLC, Cupertino, CA (US)

(72) Inventors: Abhay T. Kataria, Longmont, CO (US); Harathi Tadepalli, Los Gatos, CA (US); Robert Pomeroy, Longmont, CO (US); Daniel J. Coonen, Longmont, CO (US); Brandon W. Muhlach, Louisville, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 62 days.

This patent is subject to a terminal disclaimer.

(21) Appl. No.: 16/719,771

(22) Filed: Dec. 18, 2019

(65) Prior Publication Data

US 2020/0125437 A1 Apr. 23, 2020

Related U.S. Application Data

(63) Continuation of application No. 15/825,667, filed on Nov. 29, 2017, now Pat. No. 10,540,220.

(51) Int. Cl.
*G06F 11/00* (2006.01)
*G06F 11/07* (2006.01)
*H04N 1/00* (2006.01)

(52) U.S. Cl.
CPC ...... *G06F 11/0757* (2013.01); *G06F 11/0745* (2013.01); *H04N 1/00015* (2013.01); *H04N 1/00076* (2013.01)

(58) Field of Classification Search
CPC ............ G06F 11/0727; G06F 11/0745; G06F 11/0757; G06F 11/0778; G06F 11/0784
See application file for complete search history.

(56) References Cited

U.S. PATENT DOCUMENTS

| | | | |
|---|---|---|---|
| 6,438,715 B1 | 8/2002 | Assouad | |
| 8,793,532 B1 | 7/2014 | Tsai | |
| 9,049,105 B1 | 6/2015 | Feinstein | |
| 2002/0036850 A1* | 3/2002 | Lenny | G11B 20/1879 360/31 |
| 2005/0015644 A1 | 1/2005 | Chu | |
| 2005/0071557 A1 | 3/2005 | Kawamura | |
| 2009/0019320 A1 | 1/2009 | Neary | |
| 2013/0198574 A1 | 8/2013 | Higley | |
| 2014/0059013 A1 | 2/2014 | Chao | |
| 2015/0220413 A1 | 8/2015 | Hindi | |

* cited by examiner

*Primary Examiner* — Joshua P Lottich
(74) *Attorney, Agent, or Firm* — Holzer Patel Drennan

(57) ABSTRACT

A method for identifying a drive malfunction source includes receiving as input multiple drive event records each recorded by a different one of multiple storage drives in a mass storage system. Among other data, each one of the drive event records including internal tasks performed by the associated storage drive and communications transmitted between an external host and a controller of the associated storage drive. The method may further include comparing the drive event records using a processor to identify at least one discrepancy in recorded drive events indicative of the drive malfunction source.

22 Claims, 5 Drawing Sheets

| Event Type | Description | Event Code |
|---|---|---|
| Reset | A PHY layer reset event occurs (COMRESET) | 0x20 |
| Command (Read) | A host read command received (akin to a FIS 27) | 0x01 |
| Command (Write) | A host write command received (akin to a FIS 27) | 0x02 |
| Command (Other) | A host command received (akin to a FIS 27) | 0x10 |
| Command Complete | The drive completed a host command (akin to a FIS 34) | 0x40 |
| Streaming (Entry) | The drive entered streaming mode (on seq r/w) | 0x04 |
| Streaming (Exit) | The drive exited streaming mode | 0x08 |

FIG. 4

IN-DRIVE BUS TRACE

CROSS REFERENCE TO RELATED APPLICATIONS

The present application is continuation application of U.S. patent application Ser. No. 15/825,667, now issued as U.S. Pat. No. 10,540,220, which was filed on Nov. 28, 2019 and titled "In-Drive Bus Trace." This application is hereby incorporated by reference for all that it discloses or teaches.

BACKGROUND

It can be difficult to troubleshoot drive malfunctions in mass data storage systems for a number of reasons. The success of troubleshooting often depends upon the availability of accurate drive activity records; yet, drive users may not 'know' or have any records in leading up to a reported drive failure. In some cases, a drive maintenance specialist may be asked to visit a mass data storage facility to collect system diagnostic information. For example, the specialist may visit a data center and attach a piece hardware known as a "bus analyzer" between a host and a grouping of storage drives to log certain events, such as host commands and associated timing information. The viability and usefulness of bus analyzers is limited by the number of physical connection ports on each bus analyzer. Since bus analyzers couple to a limited number of storage drives (e.g., up to four connections), several bus analyzers may be employed simultaneously or one-by-one to collect a meaningful amount of data from a large number of storage drives in a storage system. Additionally, bus analyzers may inherently introduce latencies and disrupt timing of data flows within the system.

The use of bus analyzers is further complicated by recent trends in compact data storage. In many cases, storage drives are physically coupled in such tight drive-to-drive proximity that individual drive input ports are not available or difficult to access and/or service. As a result, these systems can make it difficult or physically impossible to couple a bus analyzer in the traditional manner. Further still, some high-security data storage sites prohibit visitation by outside maintenance personnel. For example, users of a data center may prohibit on-site analytics collection and request that the manufactures of the storage hardware perform all troubleshooting remotely.

SUMMARY

Implementations disclosed herein provide systems and methods for logging and/or using drive event data to identify a drive malfunction source. According to one implementation, a method includes receiving as input multiple drive event records each recorded by a different one of multiple storage drives in a mass storage system. Each one of the drive event records including internal tasks performed by the associated storage drive and communications transmitted between a host and a controller of the associated storage drive. The method further comprises comparing the multiple drive event records to one another using a processor to identify at least one discrepancy in recorded drive events indicative of the drive malfunction source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIG. 4 illustrates example types of drive events that may be logged by an in-drive bus trace.

DETAILED DESCRIPTION

Figure 1:
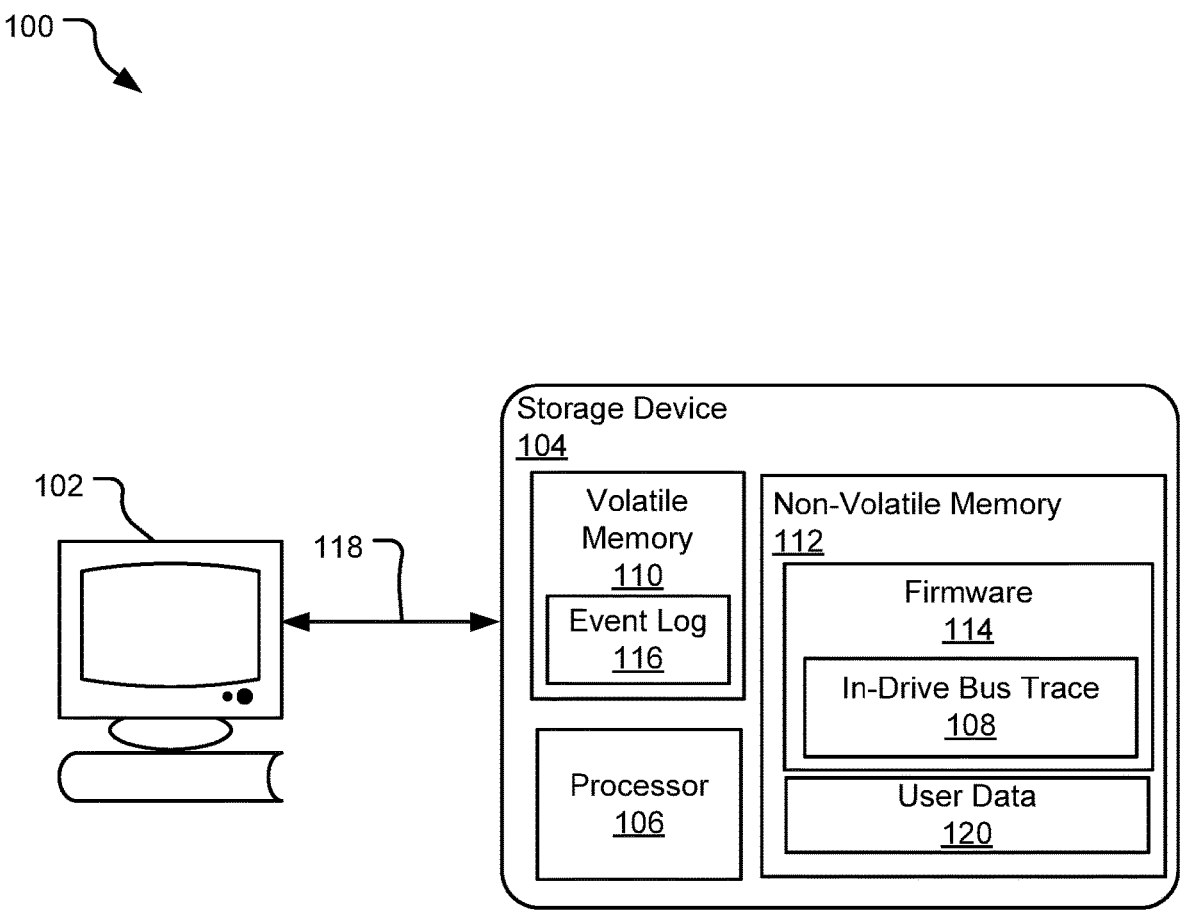
FIG. 1 illustrates an example data storage system including a storage device with an in-drive bus trace that facilitates remote debugging and fault identification.

FIG. 1 illustrates an example data storage system 100 including a storage device 104 with an in-drive bus trace 108 that facilitates remote debugging and fault identification. The storage device 104 make take on different forms in different implementations but includes at least a processor 106 and one or more tangible computer-readable storage media (e.g., volatile memory 110, non-volatile memory 112), which can store data in sequential units (e.g., cells or data blocks) that are accessible by a computer, such as a host computer 102. As used herein, the term "tangible computer-readable storage media" includes, but is not limited to, RAM, ROM, EEPROM, solid state memory (e.g., flash memory), CDROM, digital versatile disks (DVD) or other optical disk storage, magnetic cassettes, magnetic tape, magnetic disk storage or other magnetic storage devices, or any other medium that is a tangible article of manufacture usable to store the information that can accessed by a computer. In contrast to tangible computer-readable storage media, intangible computer-readable communication signals may embody data resident in a modulated data signal, such as a carrier wave or other signal transport mechanism.

In various implementations, the non-volatile memory 112 may take on a variety of different forms including various forms including without limitation solid state memory and magnetic disk storage. Similarly, the volatile memory 1110 may take on various forms including without limitation RAM, DRAM, F-RAM, and MRAM.

In one implementation, the storage device 104 includes firmware (e.g., software and/or hardware) that interprets signals received from a host computer 102 as data access commands and controls circuitry of the storage device 104 to execute the data access commands. As used herein, a 'data access command' is an operation that includes access to or alteration of data stored in the non-volatile memory 112, such as reading data, writing data, or erasing data.

The processor 106 and volatile memory 110, may, in some implementations, be included in a same integrated circuit such as a system-on-chip (SoC) or an application-specific integrated circuit (ASIC). The non-volatile memory 112, in contrast, is used to store user data 120 and firmware 114, which may be selectively loaded into the volatile memory 110. In some implementations, the firmware 114 also includes hardware components.

In FIG. 1, the firmware 114 is shown to include an in-drive bus trace 108. In general, the in-drive bus trace 108 logs certain activities of the storage device 104 and/or records information pertaining to various transmissions received and/or sent along an interface 118 to and from the host computer 102. In one implementation, the host computer 102 selectively instructs the storage device 104 to enter an event tracking mode. For example, the host computer 102 may transmit an event tracking mode entry command along the interface 118 to cause the in-drive bus trace 108 to begin logging certain types of information in an event log 116. In other implementations, the in-drive bus trace 108 enters the event tracking mode responsive to other types of events.

In FIG. 1, the event log 116 is shown to reside in the volatile memory 110 (e.g., DRAM), but may, in other implementations, be stored in the non-volatile memory 112, such as on a hard drive disk or within a solid state storage. In general, the event log 116 includes information pertaining to instructions received and actions taken by the storage device 104, herein referred to as drive event data. In one implementation, the information recorded in the event log 116 includes commands transmitted along the interface 118 between the host computer 102 and the control electronics of the storage device 104. For example, the in-drive bus trace 108 may record each command received along the interface 118 in association with a timestamp of the command receipt. For read and write commands, the in-drive bus trace 108 may, in some implementations, record the logical addresses targeted and/or size of data written. Commands recorded in the event log 116 include drive access commands, but may also include other host-initiated commands that do not request any drive access action. For example, certain commands may request statistics or health and safety information from the storage device (e.g., temperature or vibration information). In one implementation, commands received along the interface 118 are recorded in the event log 116 regardless of whether or not each command is successfully executed by the storage device 104.

In addition to recording host-initiated commands received at the storage device 104, the in-drive bus trace 108 may also log drive events pertaining to actions (if any) taken by the storage device 104 responsive to receipt of each command. For example, the in-drive bus trace 108 may record whether each host-initiated command is accepted (recognized) or rejected (not recognized) by firmware of the storage device 104, and what, if any, actions the storage device 104 takes in response to receipt of each host-initiated command. For example, the event log 116 may indicate whether a received host-initiated command resulted in a reset of one or more components of the storage device 104, whether the host-initiated command caused the storage device 104 to enter or exit a data streaming mode (e.g., a mode of reading a data stream from or writing a data stream to the non-volatile memory 112), or whether the storage device 104 performed other actions responsive to receipt of the host-initiated command.

In addition to logging commands received from the host computer 102 and certain responses of the storage device 104 triggered by each command, the in-drive bus trace 108 may, in some implementations, record "internal tasks" in the event log 116. As used herein, the term "internal tasks" is used to refer to actions that the firmware 114 of the storage device 104 initiates that are not responsive to a received host instruction. For example, the firmware 114 may self-initiate certain activities such as calibrations to ensure data integrity as well as actions to clean-up and organize data. Since these activities are drive-initiated, information relating to these activities is typically not reported to the host computer 102. As a result, such activity is not captured by other modes of event tracing. For example, internal tasks are not captured by a bus analyzer placed along an interface 118 between the storage device 104 and the host computer 102.

In one implementation, the in-drive bus trace 108 continues to record drive event data in the event log 116 for a period of time until an allocated memory region is full or until the host computer 102 transmits a secondary command instructing the storage device 104 to exit the event tracking mode. The storage device 104 may automatically or upon request (such as in response to an "export" command) export the event log 116 back to the host computer 102 for a debugging analysis. Using the event log 116, a debugging platform (not shown) can perform a detailed analysis on various drive events leading up to a reported drive malfunction by the host computer 102. In many cases, for example, the host computer 102 reports a generalized error to an end user when one other storage drives does not perform as expected. This action is also sometimes referred to as the host computer 102 "failing the storage drive."

The in-drive bus trace 108 facilitates capture of detailed information in the event log 116 that is usable to diagnose specific causes of reported drive malfunctions. In one implementation, the event log 116 is usable to reconstruct a workload that was previously assigned to the storage device 104 by the host computer 102. When this workload is analyzed in conjunction with other data in the event log 116, such as responses of the storage device 104 to each command in the workload and timing information regarding internal priority tasks, an entire chain of drive events (e.g., internally and externally initiated events) can be remotely replicated, simplifying the identification of a drive or system malfunction source. Consequently, debugging can be performed remotely without physical access to the storage device 104.

Figure 2:
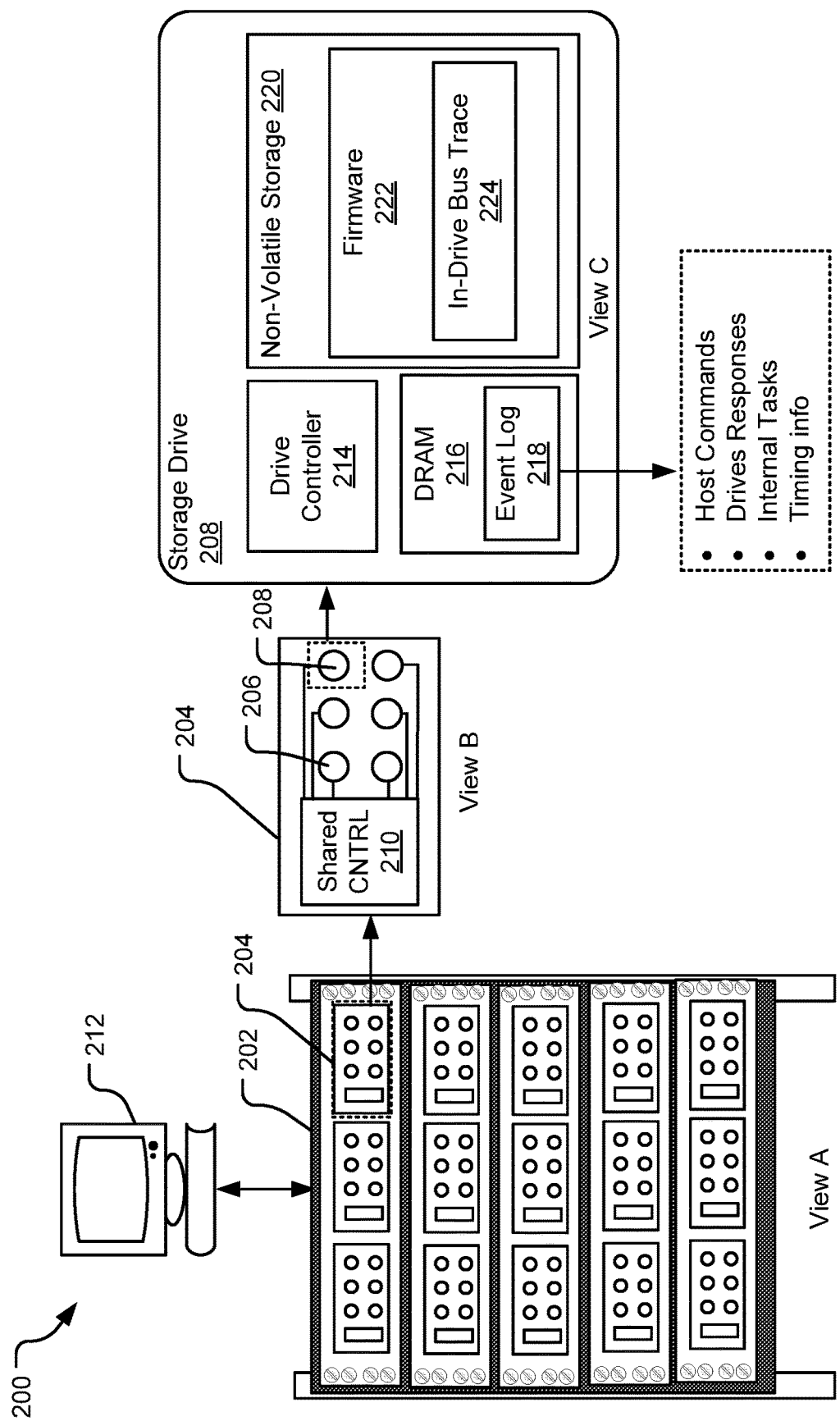
FIG. 2 illustrates an example mass data storage system including multiple storage drives that each include an in-drive bus trace to record information that facilitates remote debugging and fault identification.

FIG. 2 illustrates an example mass data storage system 200 including multiple storage drives that each include an in-drive bus trace (e.g., an in-drive bus trace 224) to record information that facilitates remote debugging and fault identification. The mass data storage system 200 (e.g., a server cluster or farm) is comprised of one or more storage racks (e.g., a storage rack 202) located in the same or two or more different facilities such as data rooms or data centers. In some implementations, a first quantity of storage racks is located in a first server facility, a second quantity of storage racks is located in a second server facility, and so on. The server facilities may be separated by any distance (e.g., several feet or many miles). The mass data storage system 200 may accommodate any number of storage racks and each rack may be located in one of any number of server facilities. The mass data storage system 200 may accommodate any use of mass data storage including without limitation content delivery, backup, archiving, running scientific simulations, and rendering computer generated imagery.

In implementations where the mass data storage system 200 includes multiple racks, the racks and associated storage devices may be interconnected to one another via a computer network, such as Gigabit Ethernet or a custom interconnect network, using a variety of suitable communication protocols (e.g., transmission control protocol/internet protocol ("TCP/IP"), packet over synchronous optical networking/synchronous digital hierarchy ("SONET/SDH"), multi-protocol label switching ("MPLS"), asynchronous transfer mode ("ATM"), Ethernet, and frame relay).

In FIG. 2, the storage rack 202 includes an array of storage units (e.g., a storage unit 204) which further include a number of storage resources. Although each storage unit may include any number of storage resources, the storage unit 204 is shown in Views A and B of FIG. 2 as including 6 storage drives (e.g., storage drives 206, 208). Within the storage unit 204, the storage drives are controlled by a common storage unit controller (e.g., a shared controller 210). In various implementations, some or all of the control hardware and software of the various storage drives may be removed to the corresponding shared controller and/or rack controller (not shown), thereby centralizing certain control functions of the individual storage drives to a storage unit level and/or to a rack level. In other implementations, the storage drives within the storage rack 202 do not share control hardware and/or software. For example, each individual drive may include its own control hardware and/or software for independently processing and implementing commands received from a host computer 212. The individual drives within each of the storage units may utilize any available storage technology (e.g., magnetic storage, optical storage, solid state storage (e.g., flash-based solid state), or any combination thereof).

In one implementation, the shared controller 210 is a printed circuit board assembly ("PCBA") that includes various control electronics, such as one or more peripheral interface controllers ("PICs"), application-specific integrated circuits ("ASICs") and/or systems on chips ("SoCs"). Such control electronics may be further connected to an array of switches (not shown) that communicatively couple the shared controller 210 to individual storage drives within each one of the storage units. In various implementations, the shared controller 210 may perform different functionality such as to ready individual targeted drive(s) for data access operations initiated by the host computer 212.

As shown by the storage drive 208 in View C, each one of the storage drives (e.g., 206, 208) may also include a drive controller 214, which includes at least a processor and processor-executable instructions for executing firmware 222 responsive to receiving incoming host commands from the shared controller 210. In one implementation, the drive controller 214 is an SoC that sends read/write signals to a drive preamplifier.

In addition to the drive controller 214, the storage drive 208 further includes volatile storage (e.g., DRAM 216) and non-volatile storage 220, which may include one or more solid state or magnetic storage media. The firmware 222 is stored in the non-volatile storage 220 and is, in some implementation, loaded into the DRAM 216 when the storage drive 208 is powered on. The drive controller 214 executes an in-drive bus trace 224, which is shown as part of the firmware 222.

Responsive to an instruction from the host computer 212, the in-drive bus trace 224 is executed by the drive controller 214 to log certain activities of the storage drive 208 and to record information pertaining to various transmissions received from the host computer 212 at the drive controller 214. In one implementation, the host computer 212 transmits an event tracking mode entry command that instructs one or more storage drives in the mass data storage system 200 to enter an event tracking mode. In one implementation, the host computer 212 instructs all storage drives in the data storage system to begin tracking event data at a same time. Responsive to receipt of the event tracking mode entry command, the shared controller 210 conveys the command to one or more targeted drives, and the drive controller 214 of the targeted drive(s) recognizes the host command as an instruction to initialize the in-drive bus trace 224.

Upon initialization, the in-drive bus trace 224 creates an event log 218 and begins recording certain types of event data within the event log 218. In FIG. 2, the event log 218 is shown in the DRAM 216; in other implementations, however, the event log 218 is stored in different locations such as within the non-volatile storage 220. In one implementation, the event log 218 includes an identifier for each command received from the host computer 212 along with a timestamp indicating when that command was received at the storage drive 208. Host commands recorded may, for example, include drive access commands (e.g., read commands, write commands) and a variety of other types of commands that do not instruct the performance of any particular action on the non-volatile storage 220.

In one implementation, the in-drive bus trace 224 makes a record of every command received from the host computer 212 as well as drive responses to each command, such as errors and/or drive activities initiated in response to each particular command. For example, one entry in the event log 218 may indicate that the storage device entered a streaming mode (e.g., streaming read or write data) at a set time and another entry in the event log 218 may indicate that the storage drive 208 exited the streaming mode at another time. When the storage drive 208 receives a command from the host computer 212 that causes a drive error, the in-drive bus trace 224 may create another entry in the event log 218 including information about the error (e.g., an error code) and a timestamp indicating the time the error occurred. For example, one entry in the event log 218 may indicate that the storage drive 208 was unable to process an unsupported host command.

In one implementation, the event log 218 includes an entry associated with completion of each host command successfully executed by the storage drive 208. For example, the host computer 212 may command the drive to perform an integrity check of some type, and the in-drive bus trace 224 may create a new event record in the event log to indicate that the integrity check was completed and the time that it was completed.

In addition to the information described above, the in-drive bus trace 224 may also record certain types of internal tasks, such calibrations to ensure drive health and integrity as well as actions to clean-up and organize data. In yet another implementation, the in-drive bus trace 224 additionally records protocol layer information exchanged between the drive controller 214 and the shared controller 210 and/or the host computer 212. For example, the shared controller 210 may include a SATA or SAS layer controller that performs a "handshake" to ensure a particular drive is ready to receive and handle a host command. In some implementations, the in-drive bus trace 224 records this protocol layer information with a high-power processor in the storage drive 208, such a high-power processor capable of recording timestamp information with nanosecond granularity. For example, the processor used to execute the in-drive bus trace 224 may, in some implementations, be different than the processor used to execute the drive controller 214.

In one implementation, each storage drive 208 within each storage unit (e.g., the storage unit 204) in the mass data storage system 200 includes an in-drive bus trace with characteristics and logging capabilities the same or similar to those described above with respect to the in-drive bus trace 224. Consequently, the host computer 212 can command all or a select subset of the storage drives (e.g., hundreds or thousands of drives) to enter an event tracking mode at a given time, causing all of the commanded storage drives to begin logging event data within an event log, such as the event log 218, within an internal memory location.

The in-drive bus trace 224 of each one of the storage drives in the mass data storage system 200 may continue logging event tracking information until an allocated memory buffer is exhausted or until a set time at which the host computer 212 commands the storage drive(s) to exit the event tracking mode. Each of the storage drives may then automatically or upon request (such as in response to an "export" command), export its own event log (e.g., the event log 218) back to the host computer 212 for debugging analysis.

In one implementation, entry into and exit from the event tracking mode is controlled by a designated drive and/or processor that separate from the host computer 212, such as a designated drive in the storage rack 202 or another rack within the mass data storage system 200. This designated drive and/or processor may perform actions such as commanding the in-drive bus trace 224 of each drive to begin event logging, terminate event logging, and export log data, and in some situations, compiling, reformatting, and/or analyzing the received event logs.

After exporting the event log information from the in-drive bus trace 224 of each of the storage drives, a debugging module (not shown) may analyze and compare the exported event logs to investigate the cause of a drive error reported within the mass data storage system 200. For example, an operator may instruct the host computer 212 to initiate the event tracking mode on all system drives to investigate a drive malfunction that is repeatedly occurring one or more drives in the system. Because event log data can be simultaneously logged within several (e.g., hundreds or thousands) of drives within the mass data storage system, meaningful statistics can be compiled from the event log data and analyzed to facilitate a higher-integrity fault analysis than that provided by traditional debugging solutions. Such analysis may, for example, facilitate workload reconstruction; analysis of statistics pertaining to average execution times, command sequences, drive activities (e.g., how internal tasks may affect execution of host commands in different situations); and more.

Figure 3:
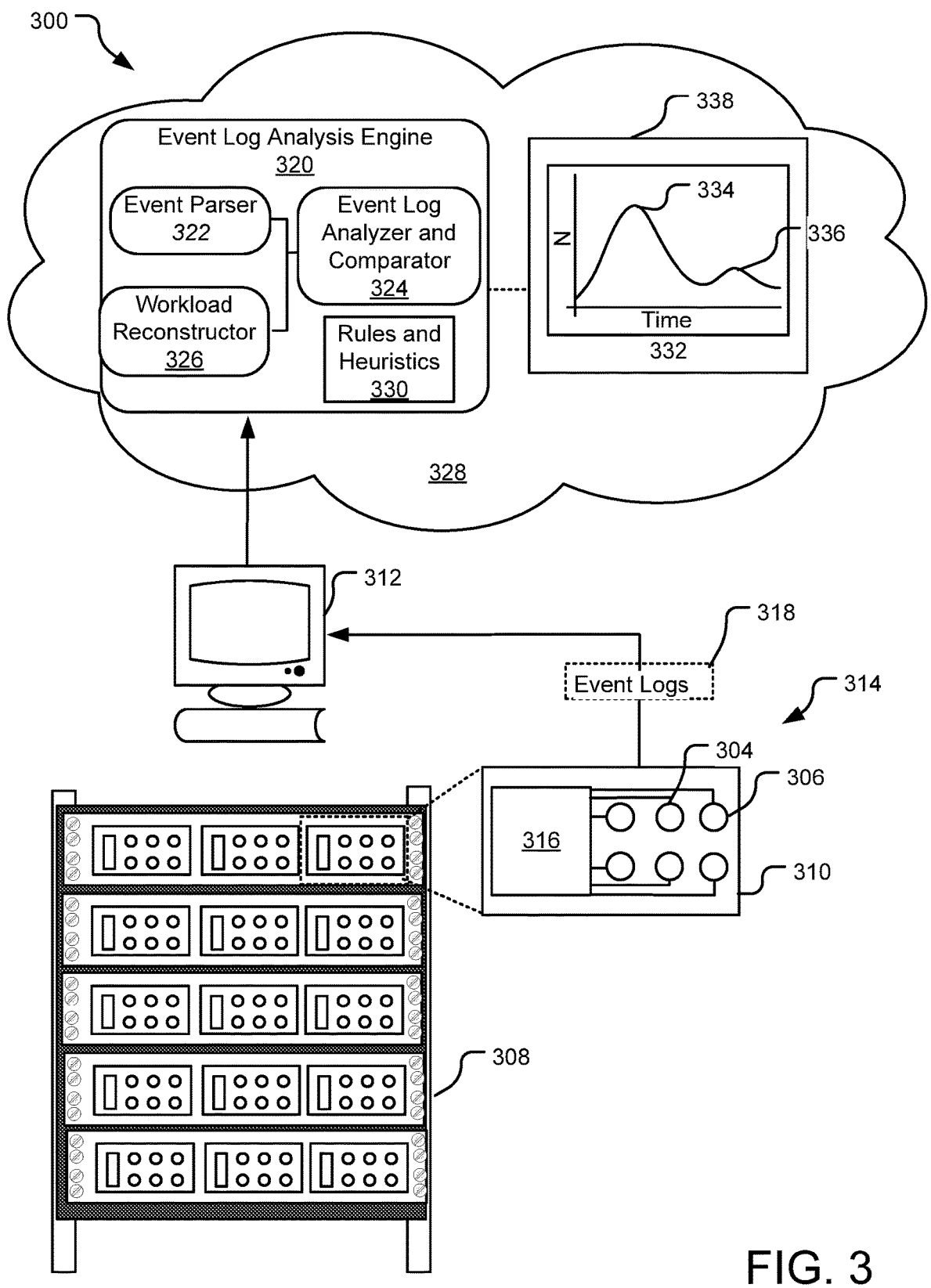
FIG. 3 illustrates an example system for collecting event data from individual drives in a data storage center and analyzing the collected data to identify one or more recorded drive events indicative of a drive malfunction source.

FIG. 3 illustrates an example system 300 for collecting event data from individual drives in a data storage center 314 and analyzing the collected data (e.g., event logs 318) to determine a drive malfunction source.

The data storage center 314 includes a number of storage drives (e.g., storage drives 304, 306) distributed between one or multiple different facilities. In different implementations, the storage drives in the data storage center 314 may take on a variety of forms and be arranged in different ways. In FIG. 3, a rack 308 is shown to include a number of storage units (e.g., a storage unit 310), each including a shared controller (e.g., a shared controller 316) for sending control signals to and from several individual storage drives in same enclosure (e.g., such as storage drives 304 and 306 in the storage unit 310). Each of the storage drives on the rack 308 may be configured to receive read and write commands from a common host, such as a host computer 312. General features of the individual storage drives may be the same or similar to those discussed with respect to the storage drive 208 in FIG. 2.

In one implementation, each of the storages drives in the rack 308 and/or in the data storage center 314 includes an in-drive bus trace executable by a processor internal to the drive to record certain drive event information in an event log, which may be saved in either volatile or volatile memory, as described above with respect to FIG. 2. Recorded information may, for example, include various received host commands, drive responses (e.g., error and actions initiated by the drive in response to a host command), drive internal priority tasks, and timing information associated with each host command. In some implementations, the in-drive bus trace of each storage drive is also further capable of recording protocol information, such as protocol layer information exchanged to ready a drive to receive data (e.g., handshake information exchanged between the storage drive and an external controller).

Responsive to a trigger event such as a command received from a host computer 312, one or more select individual storage drives in the data storage facility 314 begin recording drive event data in an event log. For example, a system operator may selectively command all drives or some drives in the data storage center 314 to enter an event tracking mode to investigate the cause of an error that one or more drives have reported back to the host computer 312.

In one implementation, the select drives continue logging event data (e.g., host commands, drive responses, internal priority tasks, and timing information) until an allocated memory buffer is full or until detection of another trigger event, such as until a command is received from the host computer 312 instructing the drives to exit the event tracking mode. Once an event logging session is complete, each of the storage drives may export the recorded event logs (e.g., event logs 318), such as automatically, responsive to host request, or responsive to some other predetermined export trigger.

The exported event logs 318 are transmitted back to the host computer 312 and/or to one or more different external processing entities for a debugging analysis. Although the debugging analysis entails a number of different actions that may be executed by one or more different processors, the actions are described herein as collectively performed by an event log analysis engine 320. The event log analysis engine 320 is shown to be coupled to the host computer 312 across a network 328; however, in some implementations the host computer 312 may be isolated from the network 328 (e.g., such as when the data storage facility 314 is a high security data center). In implementations where the event logs 318 may not be transmitted across the network 328 to the event log analysis engine 320, the event logs 318 may be downloaded onto portable storage devices and physically transported to a debugging facility that executes the event log analysis engine 320.

In one implementation, the exported event logs 318 include a collection of files, each file including event data recorded by a different storage drive in the data storage center 314. The recorded log files may span a common time period or in some implementations, different time periods, such as non-overlapping time periods during which similar time command sequences of interest are performed on different storage drives.

In FIG. 3, the event log analysis engine 320 is shown to include various computer-executable modules including an event parser 322, an event log analyzer and comparator 324, and a workload reconstructor 326. Other implementations of the event log analysis engine 320 may include other modules in addition to those shown and/or exclude some of the modules or associated functionality described herein. Upon receipt of the event logs 318, the event parser 322 performs various integrity checks, such as integrity checks to ensure that the received event logs 318 include information in an expected format. In some instances, the event parser 322 may make assumptions based on the captured event data and use these assumptions to append to the event logs 318, such as to add certain events omitted from the event log(s) for performance reasons. If, for example, a storage device is in a performance mode when the drive event data is collected, the storage device may omit certain information from the event log to increase device performance. In one implementation, the event parser 322 parses the event logs 318 to identify storage drive(s) that were in performance mode during the time period spanned by the event log. For these identified drives, the event parser 322 makes assumptions about drive events likely omitted from the associated event logs and appends these drive events or related information back into the event log.

After the event logs 318 are checked for integrity by the event parser 322, they may be provided to the workload reconstructor 326, which in turn reconstructs partial or complete workloads executed on each storage device from the associated event logs 318. For example, the workload reconstructor 326 may re-build a workload including the sequence of commands received on each storage drive during the time period spanned by the event logs 318. For each read and write command, the re-constructed workload may include the LBAs targeted and the size of data to be read or written. Comparing the reconstructed workloads for different drives and/or re-running these workloads can provide information that is useful in identifying the likely source of drive malfunction.

The event log analyzer and comparator 324 performs different types of analysis on both reconstructed workloads and the originally-captured event logs 318, both individually and collectively. From this information, the event log analyzer and comparator 324 is able to apply pre-established rules and heuristics 330 to compare the events of the event logs, identify discrepancies, and to draw inferences indicative of a likely source of a reported drive malfunction. The event log analyzer and comparator reports these inference(s) and/or the likely source(s) of the drive malfunction to a system operator. For example, the event log analyzer and comparator 324 presents a probable malfunction source to a user interface 332 viewable by a user monitoring output of the event log analysis engine 320.

In some instances, the event log analyzer and comparator 324 determines a source of a reported drive malfunction from a failed drive (e.g., a drive that reported a malfunction to a host) by analyzing the event data collected from the failed drive. For example, a failed drive may have recorded an error in the event log that closely coincides with the time of a received host command. From a recorded error code and/or timing proximity of the error recording relative to recordation of a received host command, the event log analyzer and comparator 324 may be able determine that the drive received a host command that was unsupported (e.g., not recognized by firmware of the drive's controller), that the failed drive was unable to identify the host, or that some other error occurred. In one implementation, the event log analyzer and comparator 324 determines that the failed drive received a series of multiple unsupported commands prior to the reported drive failure. Responsive to this determination, the event log analyzer and comparator 324 informs a system operator that the failed drive most likely experienced a timeout as a result of several unsupported commands received in sequence.

In another example, the event data recorded in the event log of a failed drive indicates that a failed drive held off (e.g., interrupted or postponed execution of) a host command due to an internal decision to perform a priority internal task. For example, the failed drive may have decided to recalibrate a fly height rather than execute a received I/O task, causing the I/O operation to time-out and the host computer 312 to fail the drive. The event log analyzer and comparator 324 may, in this case, identify applicable rules of the pre-established rules and heuristics 330 to identify further analysis potentially usable to draw inferences regarding the failed drive, such as the underlying reason that the failed drive initiated the priority internal task in the first place.

In some cases, the event log analyzer and comparator 324 makes initial inferences by analyzing event log data for a single drive (the failed drive) and applies these inferences in analysis and comparison of event data from multiple drives to draw secondary inferences and conclusory determinations. To continue the above example, the event log analyzer and comparator 324 may, for example, determine that "overheat" is a possible cause of the priority internal task (e.g., the self-initiated fly-height recalibration) and responsive to such determination, analyze certain workload characteristics to determine whether overheat is a likely cause of the error.

In one implementation, the event log analyzer and comparator 324 examines a reconstructed workload for the failed drive and/or for workloads reconstructed for other drives physically adjacent to the failed drive in the rack 308 to assess discrepancies in the workloads, such as to determine whether a heavy workload or heavy localized workload distribution may have caused localized in the failed drive sufficient to spike the temperature and trigger the fly-height recalibration. From the workload analysis, the event log analyzer and comparator 324 may be able to identify which LBAs are being accessed, how frequently those LBAs are being accessed. Workload reconstruction for a single drive may reveal that a same LBA space is being "beat-up" by repeated access, which may lead the event log analyzer and comparator 324 determine that a failed drive is due to excessive use or wear. In other implementations, command timing information can be analyzed along with a physical mapping of drives to determine areas within a rack or chassis that are experiencing heavy I/O, potentially causing vibrations that may affect adjacent drives. If the event log analyzer and comparator 324 determines that one or more drives in close physical proximity to the failed drive were performing heavy I/O workloads at the time of the reported malfunction, the event log analyzer and comparator 324 may output information indicating that this heavy workload likely caused a localized temperature increase that led to the drive malfunction.

In still another example, the event log analyzer and comparator 324 debugs a drive malfunction by examining command execution times for various host-initiated commands executed on the failed drive. For example, the event log analyzer and comparator 324 may analyze event data for a failed drive to identify one or more commands that took a longest amount of time to execute during the time period encompassed by the event logs 318 and/or during a time period at or near a known time of a reported malfunction. Commands that took the longest amount of time to execute are identified and statistics are compiled and analyzed to identify potential discrepancies in the execution of the identified command(s) on the failed drive and execution of the same commands on other drives in the data storage center 314.

In one implementation, event log analyzer and comparator 324 examines average command execution time (e.g., by making a histogram) for a failed drive, and determines that several read commands took a long time (e.g., 5 seconds or more) to execute on the failed drive. The execution time of these identified commands can be analyzed and compared to other drives that executed the same commands and/or the same commands on the same LBA spaces.

If the event log analyzer and comparator 324 determines that the command(s) took a similar length of time to execute on other drives that did not report errors, the event log analyzer and comparator 324 may determine that the identified command(s) are not likely related to the reported drive malfunction. On the other hand, if the event log data indicates that the identified command(s) executed differently (e.g., more quickly) on other drives, the event log analyzer and comparator 324 may determine that the slow execution time of the identified command likely caused a host to fail a drive.

In FIG. 3, the event log analyzer and comparator 324 creates an example histogram 332 plotting an average command execution time (on the x-axis) for a same command across hundreds of drives for which event data was recorded during a set period of time. The histogram 332 includes a primary bump 334 indicating that the command executed quickly on most drives and a tail bump 336 that indicates that the command took an unusually long amount of time on a few drives. Based on this, the event log analyzer and comparator 324 may recommend or take further investigative action to determine whether there is some attribute shared by the collection of drives associated with the tail bump 336 that is potentially responsible for the increased execution time for this particular command. For example, it may be that the drives associated with the longer execution time for the command are all a same type of drive that is, for example, an older drive model or a model that is prone to errors under certain known circumstances. The event log analyzer and comparator 324 may output this information for display on a user interface 338 to inform a system user of this or other identified likely causes of drive malfunction.

FIG. 4 illustrates example types of drive events 400 that may be logged by an in-drive bus trace. In one implementation, the in-drive bus trace records a drive event code identifier and a timestamp in an event log (not shown) corresponding to each command received at a storage drive, mode changes (e.g., streaming mode entry/exit) of the storage drive, and drive resets. The drive event code identifier is, for example, a numerical code corresponding in memory to a description of a particular type of drive event. In other implementations, the in-drive bus trace records other additional information such as drive errors and internal tasks (not shown among the example drive events of FIG. 4).

Figure 5:
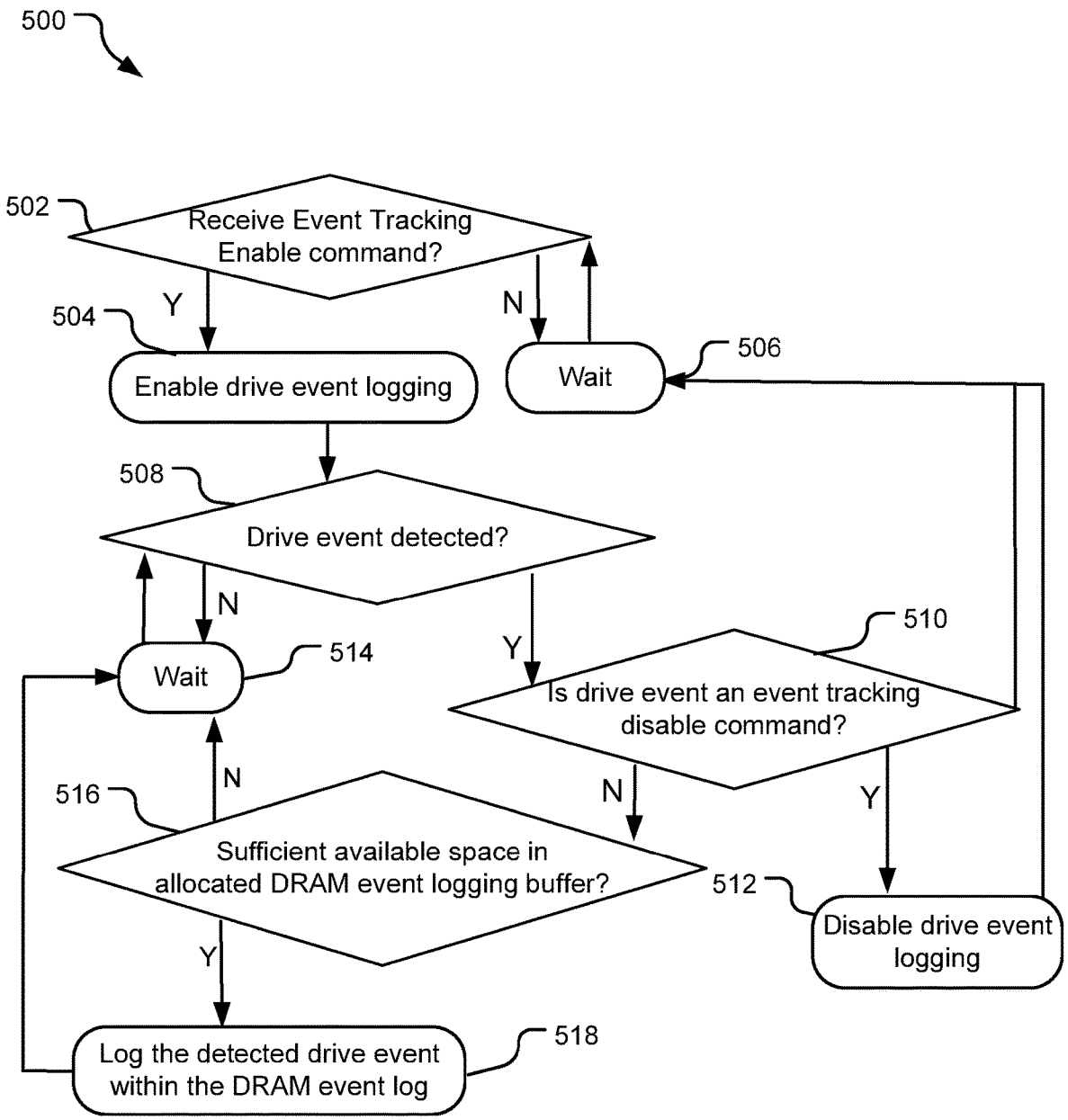
FIG. 5 illustrates example logic of an in-drive bus trace.

FIG. 5 illustrates example logic 500 of an in-drive bus trace configured to record event data, such as host-initiated commands, internal tasks, drive errors, and associated timestamp data. In one implementation, the in-drive bus trace is stored within and executable by an individual storage drive in a mass data storage system.

A determining operation 502 determines whether an "event tracking enable" has been received from an external host. If such a command is not yet received, a waiting operation 506 is assumed until such command is received. Once the drive event tracking enable command is received from an external host, a tracking mode enabling operation 504 enables a drive event logging setting of a storage device. A determination operation 508 determines whether a next drive event is detected. If not, a waiting operation 514 is assumed until the next drive event is detected. In one implementation, the determination operation 508 determines that a drive event has been detected when, for example, a next host command is received at a storage device, when an error is detected within the storage device, or when the storage device performs some action, such as an action taken responsive to a host command or a self-initiated action such as a priority internal task.

Responsive to detection of a drive event by the determination operation 508, another determination operation 510 determines whether the detected drive event is an "event tracking disable" command from the external host. If so, a tracking mode disabling operation 512 disables the event logging setting of the storage device, and the waiting operation 506 is assumed until a next event tracking enable command is received.

If, on the other hand, the determination operation 510 determines that the detected drive event is not a drive event tracking disable command, a determination operation 516 determines whether there exists enough available space in an allocated DRAM buffer to log the detected drive event. If sufficient available space exists, a logging operation 516 logs the detected drive event in the allocated DRAM buffer. For example, the logging operation 516 may add a new log entry including a drive event code identifier and a timestamp. If there is not enough available space remaining in the allocated DRAM, the detected event is not logged, and the waiting operation 514 is resumed until the next drive event is detected.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method for identifying a drive malfunction source for a storage drive using drive-internal event information without physical access to the drive, the method comprising:
   at an external host, receiving a drive event record self-generated by processor of a storage drive, the drive event record including internal tasks performed by the processor of the storage drive and also including communications transmitted between the external host and a controller of the storage drive;
   at an event log analysis engine executed by a processor of the external host, reconstructing a workload of the storage drive based at least in part on the drive event record, the reconstructed workload including both internally and externally-initiated drive events;
   remotely replicating, by the external host, execution of the reconstructed workload;

analyzing, at the event log analysis engine, outputs of the replicated workload in conjunction with responses of the storage drive recorded in the drive event record at timestamps associated with various events of the internally and externally-initiated events;

based on the analysis, identifying a select command within the reconstructed workload that failed to execute properly, the failed command execution being indicative of a malfunction source for the storage drive; and presenting information on a user interface identifying the malfunction source.

2. The method of claim 1, wherein the communications transmitted between the external host and the controller of the storage drive are recorded in a memory device in response to receipt of a command received at the storage drive.

3. The method of claim 1, wherein the drive event record further includes timing information associated with the internal tasks and the communications transmitted between the external host and the controller.

4. The method of claim 1, wherein the reconstructed workload includes a sequence of commands received by the storage drive during a time period encompassed by the drive event log.

5. The method of claim 1, wherein the drive event record is exported to the external host responsive to receipt of a host-initiated export command.

6. The method of claim 1, wherein the storage drive writes the drive event record to volatile memory of the storage drive.

7. The method of claim 1, further comprising:
performing at least one integrity check with respect to the drive event record to provide the drive event record in an expected format to the event log analysis engine prior to the reconstructing.

8. The method of claim 1, wherein the identifying further comprises applying pre-established rules and heuristics to compare events of the drive event record to identify discrepancies and infer a likely source of a reported drive malfunction based on the comparison.

9. A remote debugging system for identifying a drive malfunction source for a storage drive without physical access to the storage drive, the system comprising:
an external host comprising an event log analysis engine executed by a processor that is configured to:
reconstruct a workload of storage drive based on a drive event record received from the storage drive, the drive event record being generated by an in-drive bus trace executed by a processor of the storage drive and including a record of internal tasks performed by the storage drive and communications transmitted between the external host and a controller of the storage drive, the reconstructed workload including both internally and externally-initiated drive events;
remotely replicate execution of the reconstructed workload at the external host;
analyze outputs of the replicated workload in conjunction with responses of the storage drive recorded in the drive event record at timestamps associated with various events of the internally and externally-initiated events;
based on the analysis, identify a select command within the reconstructed workload that failed to execute properly, the failed; and
present information on a user interface identifying the malfunction source.

10. The remote debugging system of claim 9, wherein the communications transmitted between the external host and the controller are recorded in the drive event record in response to a command received at the storage drive.

11. The remote debugging system of claim 9, wherein the drive event record is exported to the external host for a debugging analysis responsive to receipt of a command received at the storage drive.

12. The remote debugging system of claim 9, wherein the storage drive writes the drive event record to volatile memory of the storage drive.

13. The remote debugging system of claim 9, wherein the drive event record further includes timing information associated with the internal tasks and the communications transmitted between the external host and the controller.

14. The remote debugging system of claim 9, wherein the reconstructed workload includes a sequence of commands received by the storage drive during a time period encompassed by the drive event record.

15. The remote debugging system of claim 9, wherein the event log analysis engine is further configured to:
receive as input the drive event record from the storage drive in addition to drive event records from a plurality of other storage drives;
compare the multiple drive event records to one another to identify a discrepancy in recorded drive events indicative of a drive malfunction source; and
present the identified discrepancy on a user interface.

16. The remote debugging system of claim 15, wherein the event log analysis engine is further configured to:
reconstruct workloads for multiple storage drives using the drive event records; and
compare the reconstructed workloads to one another to identify a discrepancy indicative of a drive malfunction source for a select one of the multiple storage drives.

17. The remote debugging system of claim 15, wherein the event log analysis engine is further configured to:
resent information a user interface information that is indicative of the identified discrepancy and the drive malfunction source.

18. One or more non-transitory computer-readable storage media encoding computer-executable instructions for executing on a processor of a computer system a computer process for identifying a drive malfunction source for a storage drive using drive-internal event information without physical access to the drive, the computer process comprising:
at an external host, receiving a drive event record self-generated by a drive processor of a storage drive, the drive event record including internal tasks performed by the drive processor of the storage drive and also including communications transmitted between the external host and a controller of the storage drive;
reconstructing, using the processor of the external host, a workload of the storage drive based at least in part on the drive event record, the reconstructed workload including both internally and externally-initiated drive events;
remotely replicating execution of the reconstructed workload at the external host;
analyzing, at the event log analysis engine, outputs of the replicated workload in conjunction with responses of the storage drive recorded in the drive event record at timestamps associated with various events of the internally and externally-initiated events; and
based on the analysis, identifying a select command within the reconstructed workload that failed to execute properly, the failed command execution being indicative of a malfunction source for the storage drive based; and presenting information on a user interface identifying the malfunction source.

19. The one or more non-transitory computer-readable storage media of claim 18, wherein the drive event record is recorded in response to a command received at the storage drive.

20. The one or more non-transitory computer-readable storage media of claim 18, wherein the drive event record further includes timing information associated with the internal tasks and the communications transmitted between the external host and the controller.

21. The one or more non-transitory computer-readable storage media of claim 18, wherein the drive event record is exported to the external host for a debugging analysis responsive to receipt of an export command at the storage drive.

22. The one or more non-transitory computer-readable storage media of claim 18,
wherein the workload includes a sequence of commands received by the storage drive during a time period encompassed by the drive event record.

* * * * *